US008226473B2

(12) United States Patent
Gazdic et al.

(10) Patent No.: US 8,226,473 B2
(45) Date of Patent: Jul. 24, 2012

(54) GAMING SOFTWARE AUTHENTICATION

(75) Inventors: Daniel J. Gazdic, Chicago, IL (US); Chad A. Ryan, Lisle, IL (US); Craig J. Sylla, Round Lake, IL (US)

(73) Assignee: WMS Gaming Inc., Waukegan, IL (US)

( * ) Notice: Subject to any disclaimer, the term of this patent is extended or adjusted under 35 U.S.C. 154(b) by 2195 days.

(21) Appl. No.: 10/119,663

(22) Filed: Apr. 10, 2002

(65) Prior Publication Data
US 2003/0195033 A1 Oct. 16, 2003

(51) Int. Cl.
A63F 9/24 (2006.01)
A63F 13/00 (2006.01)

(52) U.S. Cl. ............. 463/29; 463/43; 713/150; 713/189

(58) Field of Classification Search .......... 463/1, 16–20, 463/24–25, 29, 42–44; 380/4; 713/168, 713/150, 189
See application file for complete search history.

(56) References Cited

U.S. PATENT DOCUMENTS

| 4,405,829 A | 9/1983 | Rivest et al. ................. 178/22.1 |
| 4,462,076 A * | 7/1984 | Smith, III ......................... 463/29 |
| 4,727,544 A | 2/1988 | Brunner et al. ................. 371/21 |
| 5,231,668 A | 7/1993 | Kravitz ............................ 380/28 |
| 5,599,231 A * | 2/1997 | Hibino et al. ................... 463/29 |
| 5,643,086 A * | 7/1997 | Alcorn et al. ................... 463/29 |
| 5,644,704 A | 7/1997 | Pease et al. ............. 395/183.18 |
| 6,071,190 A | 6/2000 | Weiss et al. ...................... 463/25 |
| 6,099,408 A | 8/2000 | Schneier et al. ................. 463/29 |
| 6,106,396 A | 8/2000 | Alcorn et al. ................... 463/29 |
| 6,149,522 A | 11/2000 | Alcorn et al. ................... 463/29 |
| 6,203,427 B1 | 3/2001 | Walker et al. ................... 463/16 |
| 6,264,557 B1 | 7/2001 | Schneier et al. ................. 463/29 |
| 6,450,885 B2 | 9/2002 | Schneier et al. ................. 463/29 |
| 6,527,638 B1 | 3/2003 | Walker et al. ................... 463/25 |
| 6,565,443 B1 | 5/2003 | Johnson et al. ................. 463/43 |
| 6,595,856 B1 | 7/2003 | Ginsburg et al. ............... 463/29 |

(Continued)

FOREIGN PATENT DOCUMENTS
GB 2121569 A 12/1983
(Continued)

OTHER PUBLICATIONS

Digital Signature Standard (DSS), FIPS PUB 186-2, U.S. Department of Commerce/National Institute of Standards and Technology, 72 pages (Jan. 27, 2000).

(Continued)

Primary Examiner — Steven J Hylinski
(74) Attorney, Agent, or Firm — Nixon Peabody LLP

(57) ABSTRACT

A method of preparing memory contents of a gaming machine for subsequent authentication and a method of authenticating the prepared memory contents are disclosed. A first memory stores a game data set and a first authentication code generated from the game data set. The game data set includes game data files and second authentication codes generated from the respective data files. A second memory stores an authentication program for authenticating the first memory's contents, as well as a third authentication code generated from the second memory's contents. To authenticate the memory contents, the second memory's contents are first authenticated and, if deemed authentic, the game data set as a whole and each data file in the first memory are authenticated. The authentication process involves generating fresh authentication codes using the authentication program and comparing the fresh codes with appropriate ones of the stored authentication codes.

19 Claims, 7 Drawing Sheets

U.S. PATENT DOCUMENTS

| | | |
|---|---|---|
| 6,620,047 B1 | 9/2003 | Alcorn et al. .................. 463/37 |
| 6,685,567 B2 | 2/2004 | Cockerille et al. ............. 463/43 |
| 6,722,986 B1 * | 4/2004 | Lyons et al. ................... 463/29 |
| 7,179,170 B2 * | 2/2007 | Martinek et al. ............... 463/29 |
| 2004/0002381 A1 | 1/2004 | Alcorn et al. .................. 463/37 |
| 2004/0038740 A1 | 2/2004 | Muir ............................... 463/40 |

FOREIGN PATENT DOCUMENTS

| | | |
|---|---|---|
| JP | 8-141196 | 6/1996 |
| JP | 10-192533 | 7/1998 |
| WO | WO 97/08870 A2 | 3/1997 |
| WO | WO 97/08870 A3 | 3/1997 |
| WO | WO99/65579 | 12/1999 |
| WO | WO 99/66413 A1 | 12/1999 |
| WO | WO00/33196 | 6/2000 |
| WO | WO 01/24012 A1 | 4/2001 |
| WO | WO01/67218 A1 | 9/2001 |
| WO | WO 02/15998 A2 | 2/2002 |
| WO | WO 02/15998 A3 | 2/2002 |
| WO | WO 02/101537 A1 | 12/2002 |
| WO | WO 03/045519 A1 | 6/2003 |

OTHER PUBLICATIONS

Schneier B: "Applied Cryptography Protocols, Algorithms, and Source Code in C"; Jan. 1, 1996 , John Wiley & Sons, New York, US, XP002298839 ISBN: 0-471-12845-7—p. 431.

"JFFS—Journaling Flash File System" Jan. 15, 2003, XP002298844; URL:http://web.archive.org/web/20030115142 058/ http://developer.axis.com/software/jffs/doc/jffs.shtml—retrieved on Oct. 1, 2004—p. 1-p. 6.

* cited by examiner

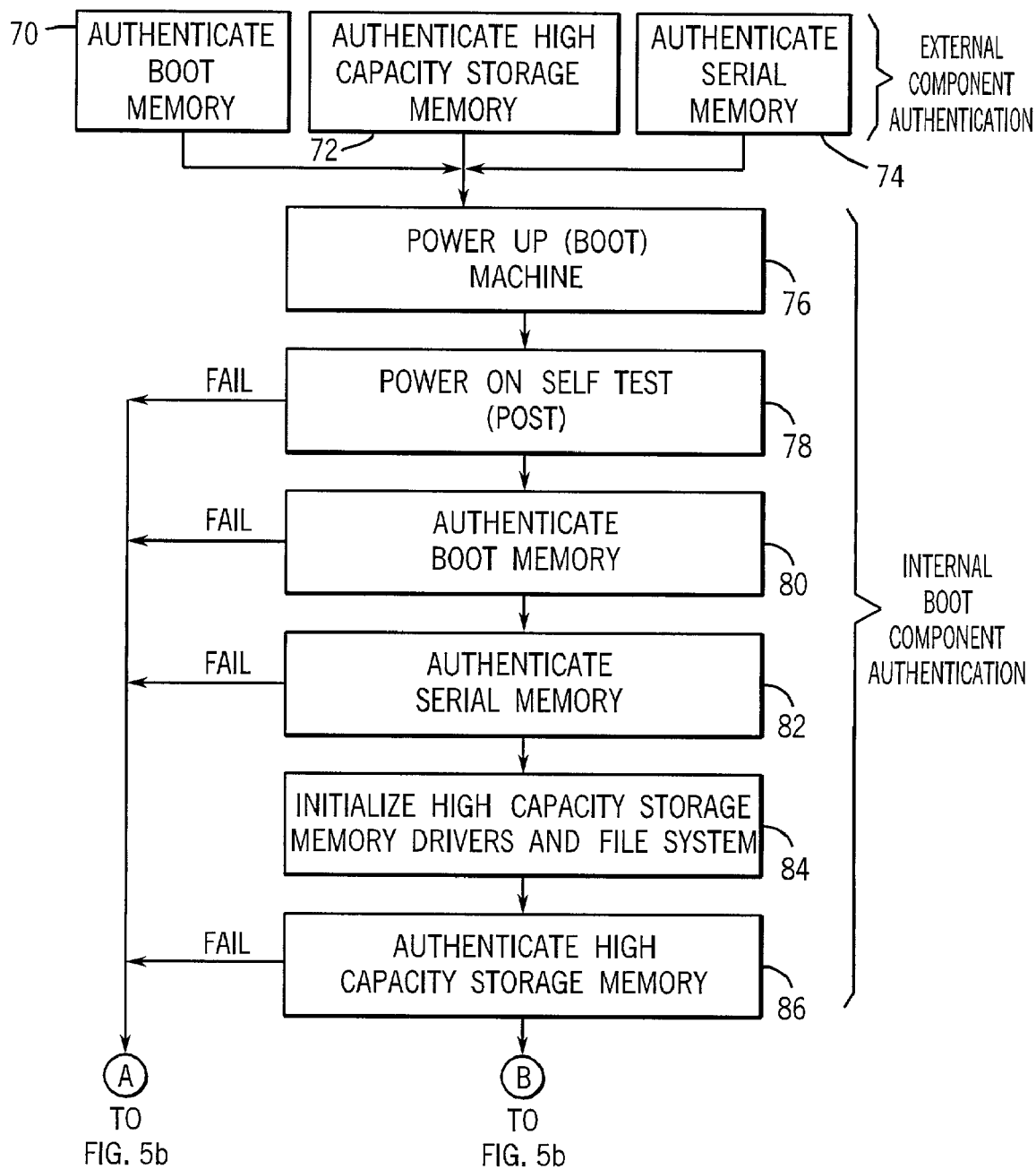

GAMING SOFTWARE AUTHENTICATION

FIELD OF THE INVENTION

The present invention relates generally to gaming machines and, more particularly, to software authentication in a gaming machine.

BACKGROUND OF THE INVENTION

As a regulatory requirement in virtually all jurisdictions that allow gaming, it is necessary to have a technique to authenticate that the software installed in a gaming machine is tested and approved. In the past, gaming manufacturers have generally used EPROM-based hardware platforms to store program code. As a result, a number of software authentication techniques have been accepted as standards throughout the gaming industry. Depending upon the preferences of the local regulatory agency, these techniques generally include either a Kobetron signature or a hash function based on the data stored in the EPROM device.

Authentication of software programs basically occurs using two different methods in the field, again determined by the local regulatory agency. In one method, each EPROM is authenticated by a gaming agent prior to being installed in a gaming machine that is to be brought up for play. The EPROMs may be shipped directly to the gaming agency for authentication prior to the install date of the machine, or may be authenticated on the casino floor as the software is being installed in the machine. In another method, authentication is conducted on a spot-check basis. A gaming agent periodically visits a casino and picks machines selectively or at random to remove the software components for authentication.

Due to advances in technology that have been made in recent years, EPROM-based hardware platforms are becoming obsolete and newer technologies are being introduced into the gaming industry. These advanced technologies utilize storage devices that have been classified as "high capacity storage devices." High capacity storage devices may, for example, include CD-ROMs, hard disk drives, and flash devices. Thus far, there is no industry standard method for authenticating these types of devices.

SUMMARY OF THE INVENTION

The present invention provides a method of preparing memory contents of a gaming machine for subsequent authentication and a method of authenticating the prepared memory contents. A first memory stores a game data set and a first authentication code generated from the game data set. The game data set includes game data files and second authentication codes generated from the respective data files. A second memory stores an authentication program for authenticating the first memory's contents, as well as a third authentication code generated from the second memory's contents. The first memory is preferably a high capacity storage device, while the second memory is preferably a boot read-only memory. To authenticate the memory contents, the second memory's contents are first authenticated and, if deemed authentic, the game data set as a whole and each data file in the first memory are authenticated. The authentication process involves generating fresh authentication codes using the authentication program and comparing the fresh codes with appropriate ones of the stored authentication codes.

BRIEF DESCRIPTION OF THE DRAWINGS

The foregoing and other advantages of the invention will become apparent upon reading the following detailed description and upon reference to the drawings.

FIGS. 5a and 5b are a flow diagram of a multi-stage authentication procedure executed external to the gaming machine and then internal to the gaming machine during a system boot process.

Figure 1:
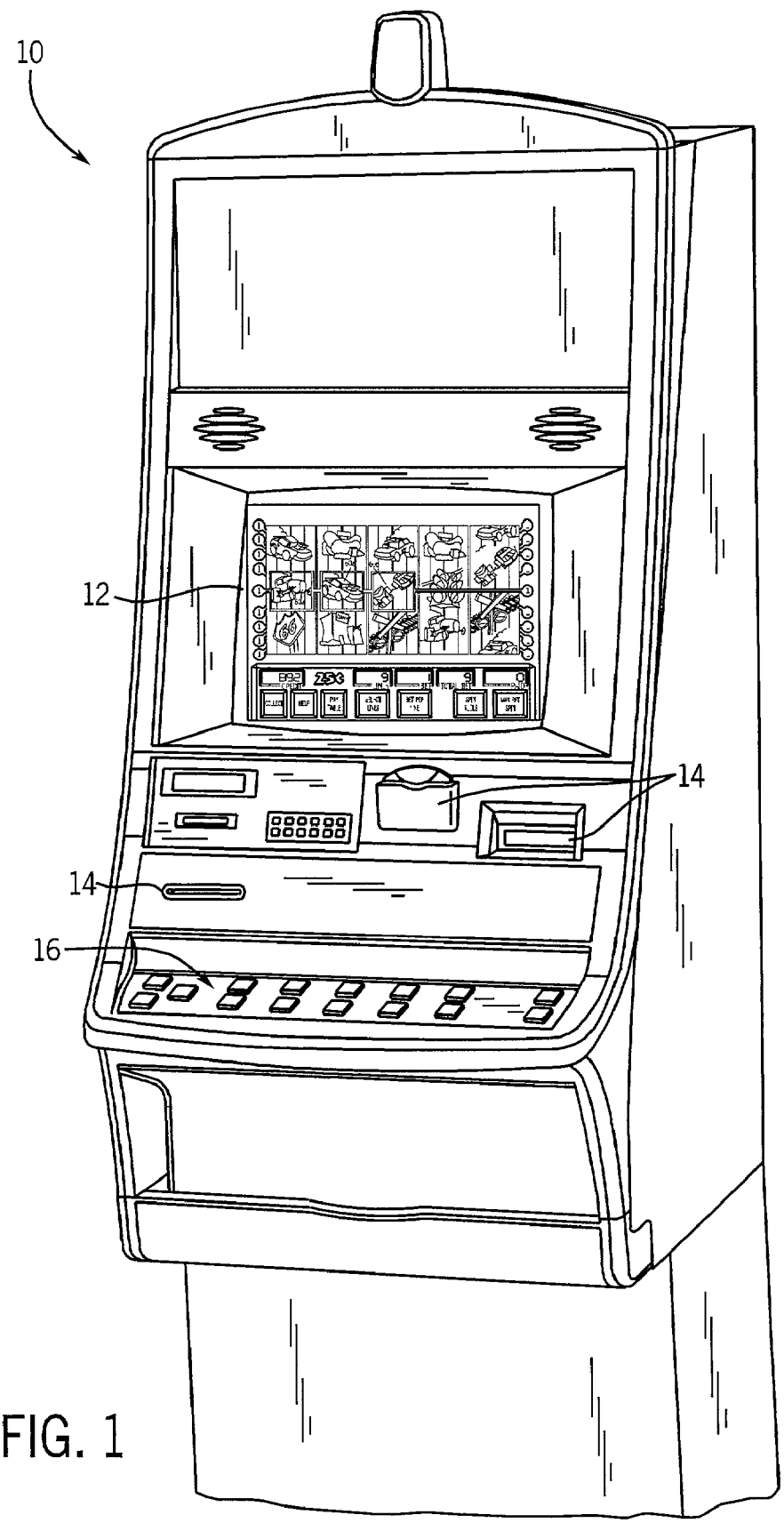
FIG. 1 is an isometric view of a gaming machine operable to conduct a wagering game.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Turning now to the drawings and referring initially to FIG. 1, a gaming machine 10 is operable to conduct a wagering game such as mechanical or video slots, poker, keno, bingo, or blackjack. If based in video, the gaming machine 10 includes a video display 12 such as a cathode ray tube (CRT), liquid crystal display (LCD), plasma, or other type of video display known in the art. A touch screen preferably overlies the display 12. In the illustrated embodiment, the gaming machine 10 is an "upright" version in which the display 12 is oriented vertically relative to a player. Alternatively, the gaming machine may be a "slant-top" version in which the display 12 is slanted at about a thirty-degree angle toward the player.

The gaming machine 10 includes a plurality of possible credit receiving mechanisms 14 for receiving credits to be used for placing wagers in the game. The credit receiving mechanisms 14 may, for example, include a coin acceptor, a bill acceptor, a ticket reader, and a card reader. The bill acceptor and the ticket reader may be combined into a single unit. The card reader may, for example, accept magnetic cards and smart (chip) cards coded with money or designating an account containing money.

The gaming machine 10 includes a user interface comprising a plurality of push-buttons 16, the above-noted touch screen, and other possible devices. The plurality of push-buttons 16 may, for example, include one or more "bet" buttons for wagering, a "play" button for commencing play, a "collect" button for cashing out, a "help" button for viewing a help screen, a "pay table" button for viewing the pay table (s), and a "call attendant" button for calling an attendant. Additional game-specific buttons may be provided to facilitate play of the specific game executed on the machine. The touch screen may define touch keys for implementing many of the same functions as the push-buttons. Other possible user interface devices include a keyboard and a pointing device such as a mouse or trackball.

A central processing unit (CPU) controls operation of the gaming machine 10. In response to receiving a wager and a command to initiate play, the CPU randomly selects a game outcome from a plurality of possible outcomes and causes the display 12 to depict indicia representative of the selected game outcome. In the case of slots, for example, mechanical or simulated slot reels are rotated and stopped to place symbols on the reels in visual association with one or more pay lines. If the selected outcome is one of the winning outcomes defined by a pay table, the CPU awards the player with a number of credits associated with the winning outcome.

Figure 2:
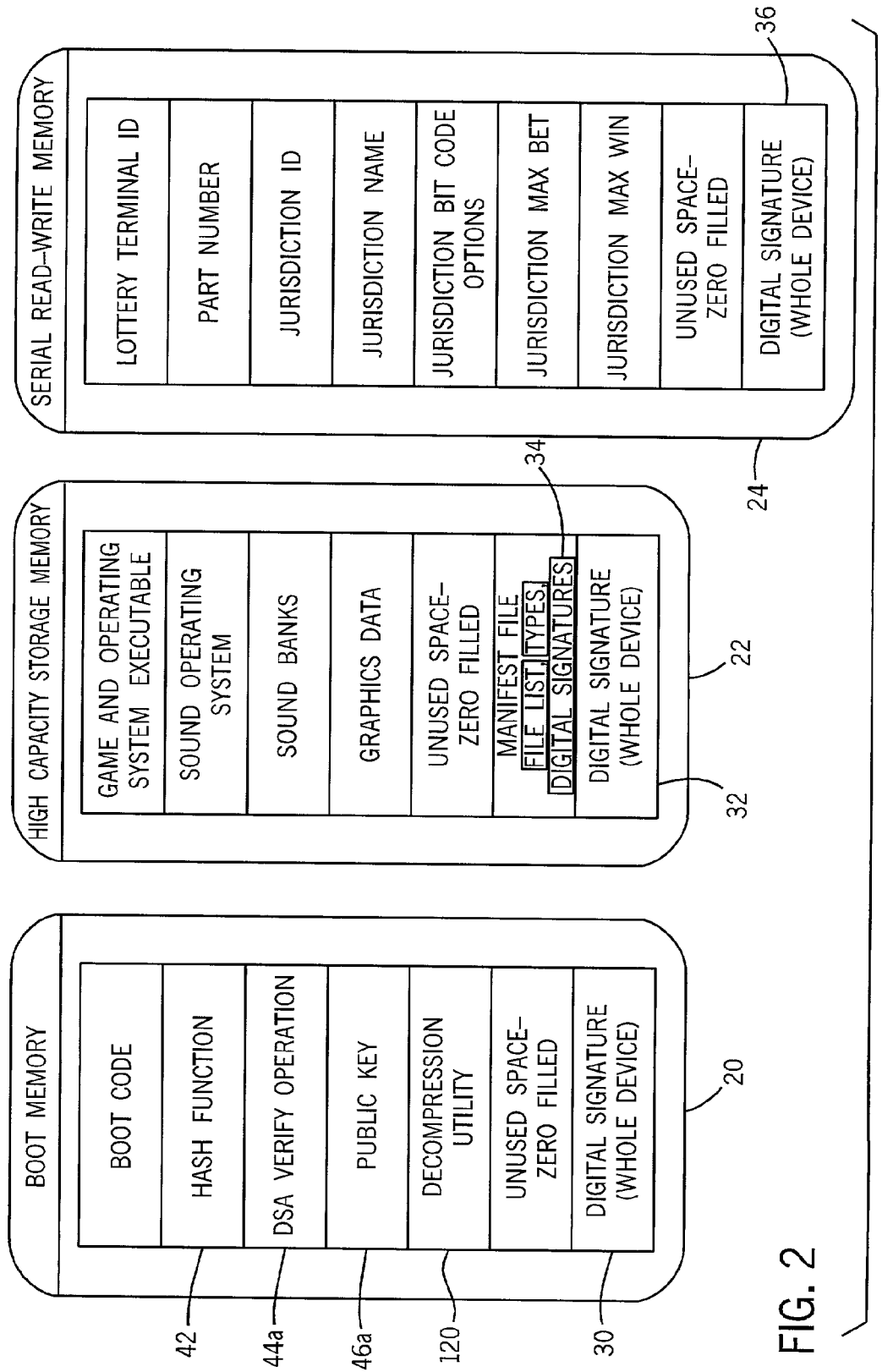
FIG. 2 is a block diagram of computer-readable storage contained in the gaming machine.

The CPU includes a microprocessor and computer-readable storage. Referring to FIG. 2, in a preferred embodiment, the computer-readable storage includes a boot memory 20, a high capacity storage memory 22, and a serial read-write memory 24. The boot memory 20 is preferably a read-only memory such as a one megabit EPROM. The high capacity storage memory 22 is preferably a compact flash card. The serial memory 24 is preferably an EEPROM such as a 512 byte SPI EEPROM. Depending upon the preferences of the local regulatory agency, all three memories may be authenticated both outside of the CPU and then when installed in the CPU at power up. The diagram in FIG. 2 displays the contents stored in each of the memories and authenticated prior to use in the gaming machine.

The boot memory 20 stores boot code, an authentication program, a RAM loader, a decompression utility 120, and a digital signature 30. The authentication program includes a hash function 42, a digital signature algorithm (DSA) verify operation 44a, and a public key 46a. The hash function 42 may, for example, be an SHA-1 hash algorithm that reduces a data set to a unique 160 bit message digest. The digital signature 30 is generated from the boot memory's contents as a whole.

The high capacity storage memory 22 stores game and operating system executable program files, sound operating system files, sound bank files, graphics files, a manifest file, and a digital signature 32. The above files, taken together, constitute a "game data set" as that term is used herein, and the various files constitute "data files" as that term is used herein. Thus, the game data set includes a plurality of data files. For each data file on the high capacity storage memory 22, the manifest file contains a file name, a file type, a load address, and a digital signature 34. The digital signature 32 is generated from the game data set as a whole, while each digital signature 34 is generated from the associated data file listed in the manifest file.

The serial memory 24 stores information specific to the jurisdiction where the CPU is to be installed. This information may, for example, include a lottery terminal identification (ID), a part number, a jurisdiction ID, a jurisdiction name, jurisdiction bit code options, jurisdiction max bet, jurisdiction max win, and a digital signature 36. The digital signature 36 is generated from the serial memory's contents as a whole.

The digital signatures 30, 32, 34, and 36 in the various memories are preferably generated and authenticated using the Digital Signature Standard as adopted by the U.S. Department of Commerce/National Institute of Standards and Technology and published in FIPS PUB 186-2 on Jan. 27, 2000.

Figure 3:
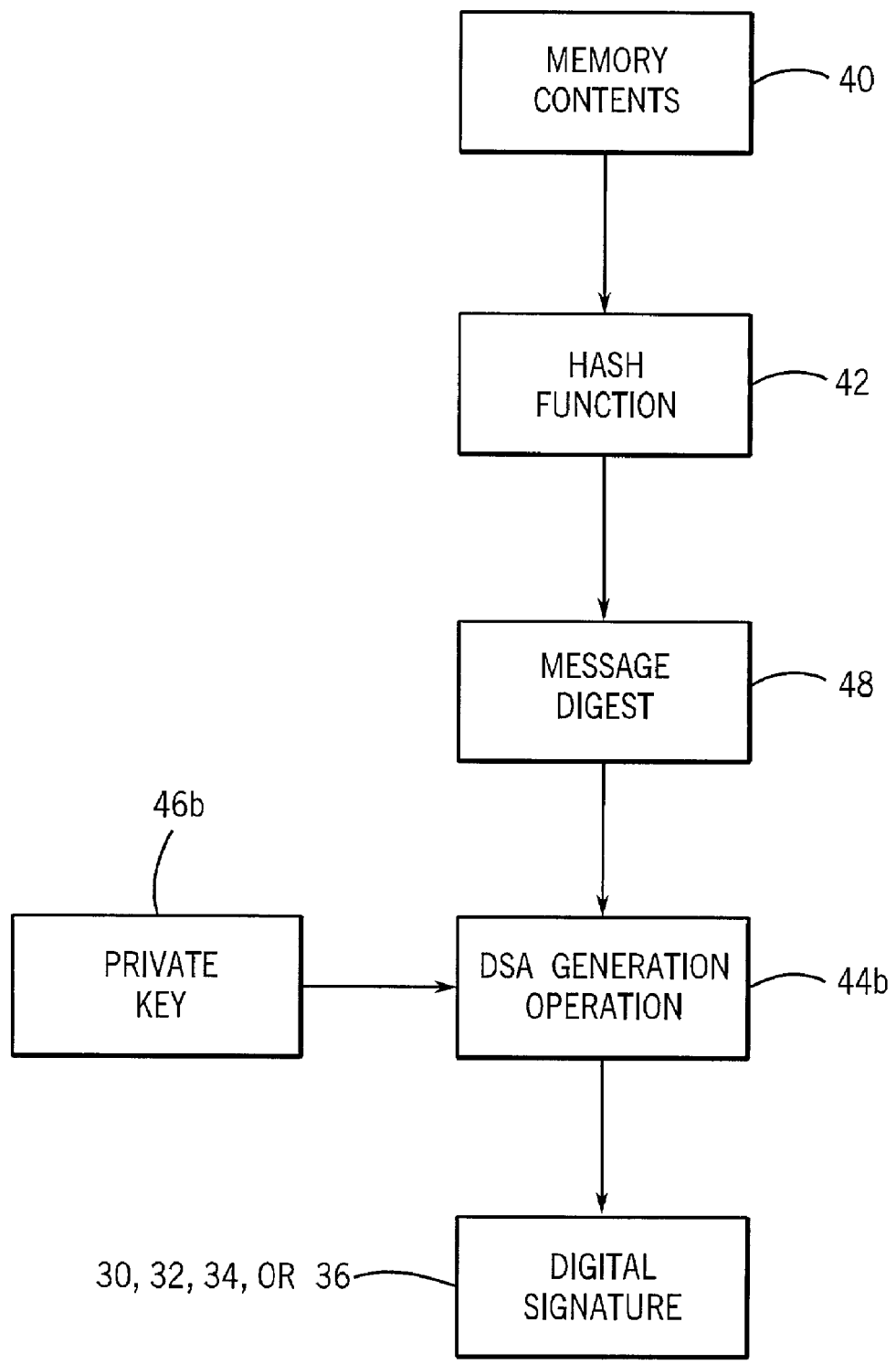
FIG. 3 is a flow diagram of a method of generating digital signatures from contents of the computer-readable storage for subsequent authentication.

FIG. 3 illustrates a method of generating the digital signatures 30, 32, 34, and 36 for subsequent authentication. The method is performed outside of the gaming machine during an engineering release process. Specifically, each digital signature is generated from associated memory contents 40 by reducing the contents 40 to a message digest 48 using the hash function 42 and then inputting the message digest 48 and a private key 46b into a DSA generation operation 44b.

The associated contents 40 from which each digital signature is generated varies as described above in connection with FIG. 2. Specifically, the digital signature 30 is generated from the contents of the boot memory 20 as a whole. The digital signature 32 is generated from the game data set in the high capacity storage memory 22 as a whole, while the digital signatures 34 are generated from the respective data files (except the manifest file) making up the game data set. Some of the data files, such as the sound and graphics files, may be compressed. A compressed data file(s) may itself include a plurality of uncompressed data files. A digital signature 34 may be generated from the compressed data file, and either a digital signature 34 or a message digest 48 may be generated from the data file prior to compression (i.e., the uncompressed data file). The digital signature 34 or message digest 48 generated from an uncompressed data file may be appended to the compressed data file. The digital signature 36 is generated from the contents of the serial memory 24 as a whole. The hash function 42 used in the signature generation method is the same as the hash function 42 stored in the boot memory 20. The aforementioned public key 46a stored in the boot memory 20 and the private key 46b form an associated pair in accordance with the Digital Signature Standard. The same public key/private key pair 46a-b is preferably used to generate and authenticate all digital signatures. Alternatively, different public key/private key pairs may be used to generate and authenticate one or more of the digital signatures.

Figure 4:
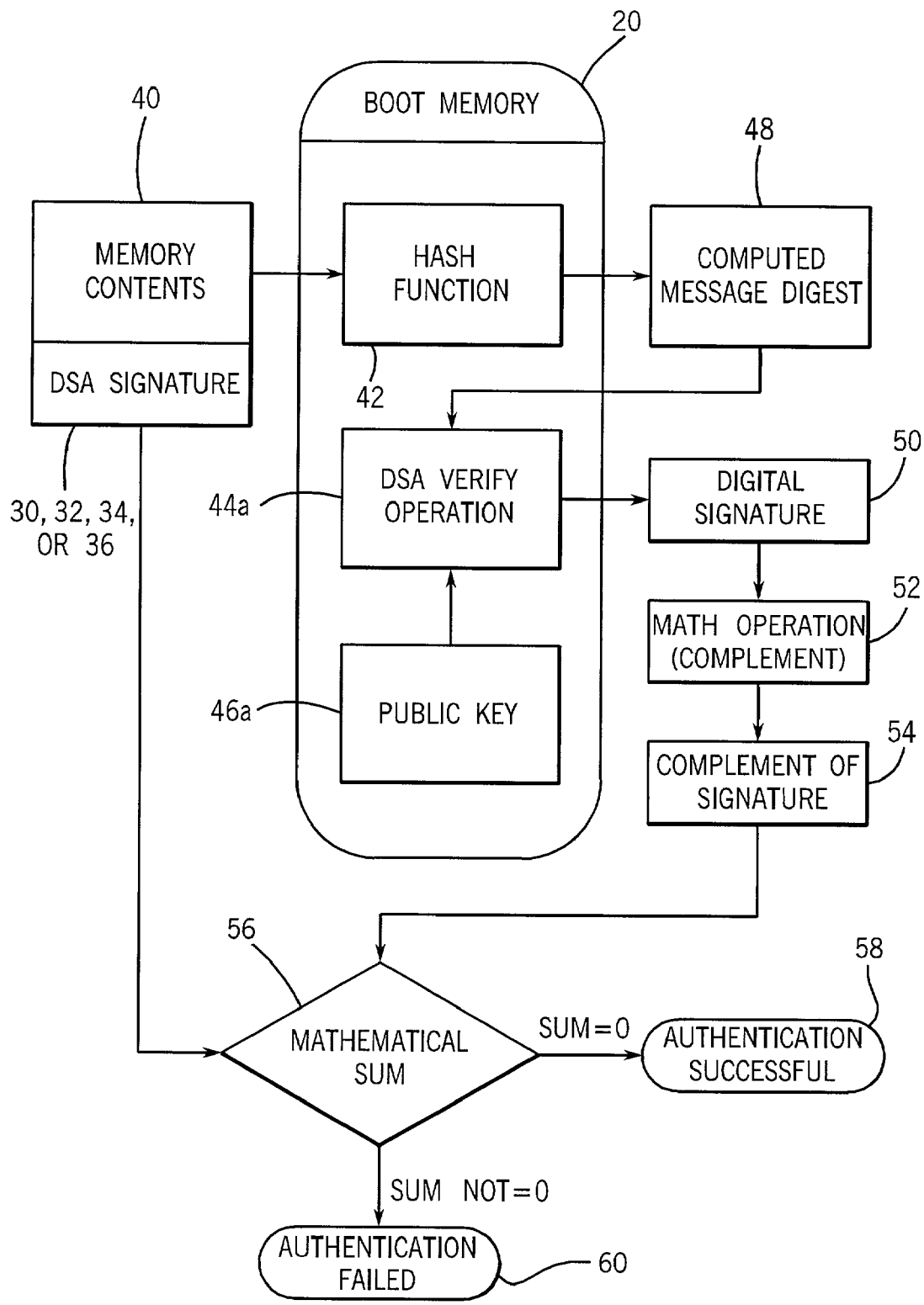
FIG. 4 is a flow diagram of a method of authenticating the digital signatures.

FIG. 4 illustrates a method of authenticating the digital signatures 30, 32, 34, and 36 already stored in the memories. The timing of this method is described below in connection with FIG. 5 and depends upon the digital signature being authenticated. The method employs the boot memory's authentication program, which includes the hash function 42, the DSA verify operation 44a, and the public key 46a. In the authentication method, a fresh digital signature 50 is generated from previously signed memory contents 40 by reducing the contents 40 to a message digest 48 using the hash function 42 and then inputting the message digest 48 and the public key 46a into the DSA verify operation 44a. The message digest 48 is also stored in a nonvolatile random access memory (RAM) for later use during continuous run-time authentication. The fresh digital signature 50 is then mathematically complemented at step 52 to yield a complement 54 of the fresh signature 50. The signature complement 54 is summed with the stored digital signature (i.e., digital signature 30, 32, 34, or 36) generated from the same memory contents 40. If the mathematic sum 56 is zero (i.e., the fresh signature 50 matches the stored signature), authentication is deemed a success at step 58. If, however, the mathematic sum 56 is not zero, authentication is deemed a failure at step 60.

Figure 5B:
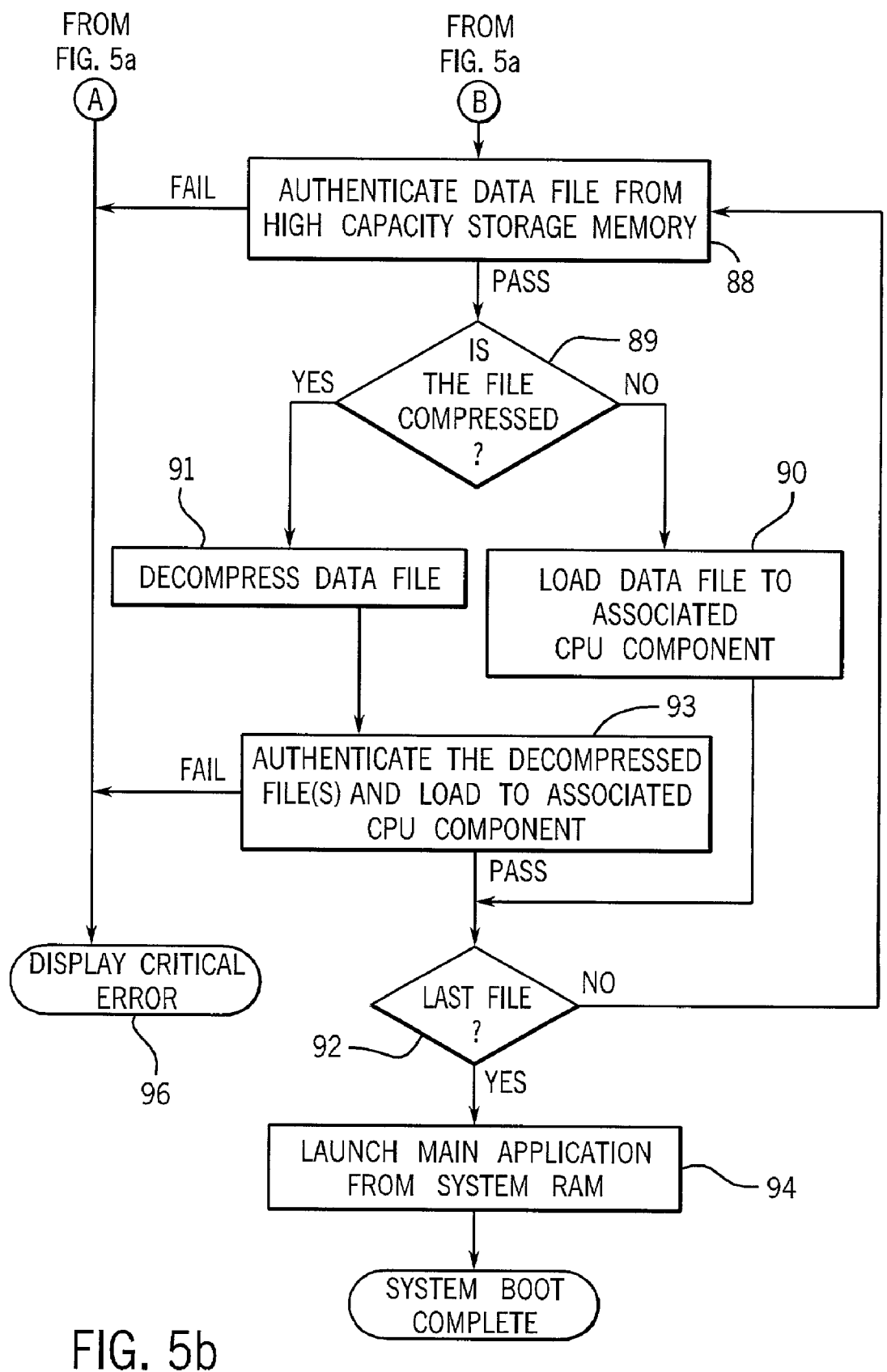

Referring to FIGS. 5a and 5b, the procedure for authenticating the contents of the memories 20, 22, and 24 is implemented in the following distinct stages: external component authentication, internal boot component authentication, file authentication and loading, and continuous run-time authentication (see FIG. 6). This authentication procedure guarantees the integrity and security of the CPU software. A failure detected in any one of the stages is considered a critical failure that must be corrected prior to any further play of the gaming machine. The machine displays the critical failure, if detected, at step 96.

External component authentication verifies the contents of the memories prior to placement in the gaming machine. Alternatively, if permitted by the local gaming agency, the memory contents may be verified using a dedicated serial port after the memories have been installed in the CPU. External component authentication of the boot memory 20 may be accomplished using industry standard techniques, such as a Kobetron MT-2000 signature or a hash algorithm for generating a unique signature (step 70). External component authentication of the high capacity storage memory 22 may be accomplished using tools commercially available from such companies as Kobetron Inc. of Navarre, Fla., Gaming Laboratories International Inc. (GLI) of Toms River, N.J., and Dataman Programmer Ltd. of Orange City, Fla. (step 72). External component authentication of the serial memory 24, which requires a serial communications interface to read from and write to the memory, may be accomplished using tools commercially available from one or more of the aforementioned companies (step 74).

Internal boot component authentication occurs immediately following power up of the machine and entails authentication of the contents of each installed memory as a whole and does not look at individual files stored in the memory. Authentication of individual files occurs during a later stage. After powering up (booting) the machine at step 76, a Power On Self Test (POST) is immediately initiated at step 78 to initialize the CPU hardware and run a few basic tests to verify that the hardware is functioning correctly. After the POST, the three memories are authenticated as a whole using the method in FIG. 4 and in the following sequence: (1) authenticate digital signature 30 of boot memory 20 at step 80, (2) authenticate digital signature 36 of serial memory 24 at step 82, and (3) authenticate digital signature 32 of high capacity storage memory 22 at step 86. The boot memory 20 is authenticated first because the other two memories rely upon the contents of the boot memory 20 to complete their own authentication processes. Prior to authenticating the high capacity storage memory 22 at step 86, that memory's drivers and file system are initialized at step 84. If all three memories have been determined to be both present and authentic, the authentication procedure proceeds to the next stage—file authentication and loading.

File authentication and loading sequentially authenticates the executable data files (except for the manifest file) stored in the high capacity storage memory 22 and loads each authenticated data file into the CPU component (e.g., system RAM) where the data file will reside and execute from during normal machine operation. The data files are loaded and processed in the order listed in the manifest file stored in the high capacity storage device 22. The manifest file itself is not loaded into the system, but rather is used during the system boot process to guide the file loading process. The order in which the data files are loaded does not have an effect on system operation.

The digital signature 34 of a data file in the high capacity storage memory 22 is authenticated at step 88 using the method in FIG. 4. If the data file is compressed, the digital signature 34 generated from the compressed data file is authenticated at step 88. If the digital signature 34 is authenticated, a check is made at step 89 as to whether or not the data file is compressed. If the data file is not compressed, the data file is loaded to an associated CPU component at step 90. The associated CPU component is identified in the manifest file. If, however, the data file is compressed, the compressed data file is decompressed using the decompression utility 120 stored in the boot memory 20 at step 91. The decompressed data file may be authenticated prior to being loaded to the associated CPU component at step 93. The message digest 48 calculated during such authentication is stored in the non-volatile random access memory (RAM) for later use during continuous run-time authentication. A check is then made at step 92 as to whether or not the loaded data file was the last file listed in the manifest file. If not, the file authentication and loading steps are repeated for the next data file listed in the manifest file. After authenticating and loading the last file and performing a RAM clear check (not shown), the main software application is launched from system RAM at step 94 to complete the system boot process. The authentication procedure then proceeds to the final stage—continuous run-time authentication.

Figure 6:
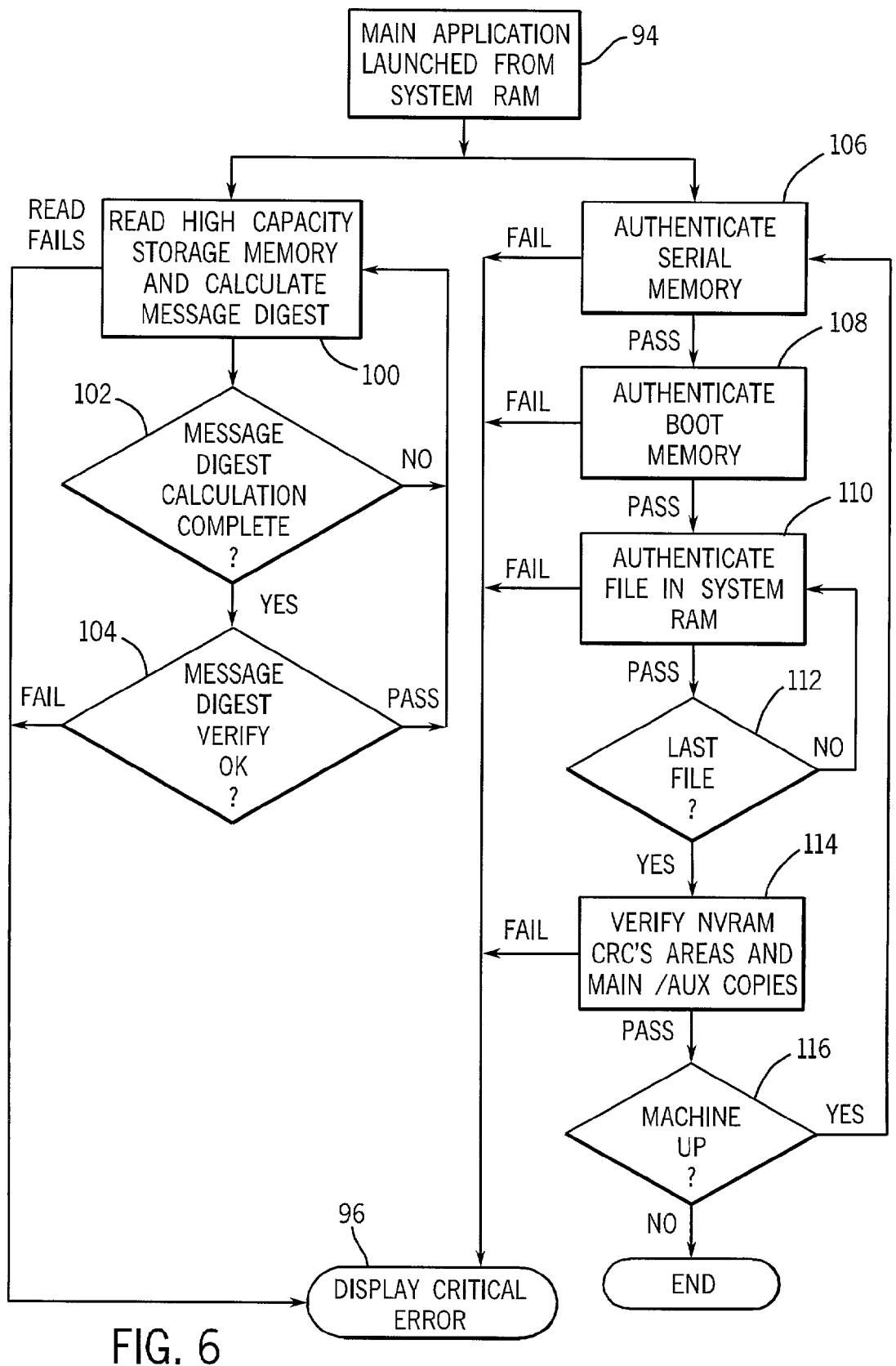
FIG. 6 is a flow diagram of a continuous run-time authentication procedure executed by the gaming machine after a main software application is launched from system RAM.

FIG. 6 illustrates a basic method of continuous run-time authentication as it will take place following the completion of the system boot process. There are two main cycles of events that occur during continuous run-time authentication. The first cycle repeatedly verifies the presence of the high capacity storage memory 22 in the CPU board, and calculates and verifies the message digest 48 (see FIG. 4) for the memory 22 as a whole at steps 100, 102, and 104. The high capacity storage memory 22 is accessed at short time intervals such as every 15 milliseconds. Any unsuccessful read of the high capacity storage memory 22 at step 100 or any unsuccessful authentication at step 104 halts the machine and causes it to display a critical error at step 96. The continuous run-time authentication of the high capacity storage memory 22 is limited to the memory as a whole and does not look at individual files stored on the memory.

The second cycle involves repetitive authentication of the serial memory 24 at step 106, the boot memory 20 at step 108, and the files that are executing from system RAM at steps 110 and 112. All authentications are preferably accomplished using the message digest 48 of the corresponding memory or file, instead of the DSA verify operation in FIG. 4. Message digests 48 of the various memories and files (including the decompressed data files) were previously stored in non-volatile RAM, and it is against these stored message digests 48 that newly calculated message digests are compared. The DSA verify operation is not necessary at this point because the memories and files were proven to be authentic during the system boot process. The purpose of continuous run-time authentication is to ensure that the information that was loaded to system RAM during the boot process has not been altered and that the memories have not been changed. A message digest 48 is sufficient for this purpose. It should be understood, however, that the DSA verify operation may instead be performed during this second cycle of continuous run-time authentication.

Following the successful authentication of all files in system RAM, the nonvolatile RAM is verified using a standard "CRC" or other similar check at step 114. Main and auxiliary copies of the non-volatile RAM are also compared to each other at step 114 to ensure the integrity of the non-volatile RAM. In accordance with step 116, all of the above functions of the second cycle continue for as long as the machine is powered on. If the machine is powered off, the authentication procedure will start again at the boot component authentication stage in FIG. 5 when the machine is powered up.

While the present invention has been described with reference to one or more particular embodiments, those skilled in the art will recognize that many changes may be made thereto without departing from the spirit and scope of the present invention.

For example, as noted above, numerous techniques may be used to prepare and authenticate a compressed data set. The compressed data set may include one or more files in the high capacity storage memory 22. In the illustrated embodiment, to prepare a compressed data set for subsequent authentication, the performed steps include compressing an uncompressed game data set; generating a first authentication code from the compressed data set; and storing the compressed data set and the first authentication code in the high capacity storage memory 22. The compressed data set may include sound files, graphics files, and even executable game code. The first authentication code may be a message digest 48 or a digital signature 34 (see FIG. 3). The manifest file in the high capacity storage memory 22 lists the compressed data set and its associated first authentication code.

Prior to compressing an uncompressed data set, a second authentication code may be generated from the uncompressed data set and appended to the compressed data set. The second authentication code may be a message digest 48 or a digital signature 34 (see FIG. 3). The manifest file in the high capacity storage memory 22 lists the compressed data set and the first and second authentication codes generated from the respective compressed and uncompressed data sets.

To authenticate a data set that has been prepared in the above manner, the performed steps include authenticating the compressed data set; decompressing the compressed data set using a decompression utility stored in the boot memory; and authenticating the decompressed data set. Both the compressed data set and the decompressed data set may be authenticated during the file authentication and loading stage shown in FIG. 5b by generating fresh authentication codes that are compared to the respective stored first and second authentication codes. If a stored authentication code is a message digest 48 (see FIG. 3), then the fresh authentication code against which it is compared is also a message digest (see FIG. 4). If, however, the stored authentication code is a digital signature 34 (see FIG. 3), then the fresh authentication code against which it is compared is a digital signature 50 (see FIG. 4). After the decompressed data set is loaded into its associated CPU component (e.g., system RAM), the decompressed data set may again be authenticated during continuous runtime authentication shown in FIG. 6 by generating a fresh authentication code that is compared to the stored second authentication code of the same type (i.e., message digest or digital signature).

The compressed data set may include a plurality of uncompressed data files. When preparing the compressed data set for subsequent authentication, a respective authentication code may be generated for each of these uncompressed files and stored in the manifest file. These authentication codes are then later authenticated after decompressing the compressed data set.

Depending upon the level of authentication needed to comply with a regulatory gaming body, the authentication method may be modified to authenticate the compressed data set only prior to decompression or only after decompression.

Each of these embodiments and obvious variations thereof is contemplated as falling within the spirit and scope of the claimed invention, which is set forth in the following claims:

What is claimed is:

1. A method of authenticating memory contents of a gaming machine, comprising:

storing, in a high capacity storage device, a game data set including a plurality of data files and a manifest file having a stored authentication code for each of the plurality of data files;

storing, in a boot memory, contents including an authentication program;

prior to operation of a wagering game on the gaming machine, authenticating the contents of the boot memory;

after authenticating the contents of the boot memory and prior to operation of the wagering game at the gaming machine, authenticating the game data set as a whole with the authentication program;

after authenticating the contents of the boot memory and the game data set as a whole, operating the wagering game at the gaming machine by using data files from the plurality of data files; and during the operation of the wagering game at the gaming machine, performing a parallel authentication of (i) the game data set as a whole in a first cycle of the parallel authentication and (ii) the data files being used to operate the wagering game in a second cycle of the parallel authentication, the authentication of the data files in the second cycle using the stored authentication codes in the manifest file within the game data set that has been authenticated as a whole in the first cycle.

2. The method of claim 1, wherein the boot memory is a read-only memory.

3. The method of claim 1, wherein the high-capacity storage device is selected from the group consisting of a CD-ROM, a hard disk drive, and a flash storage device.

4. The method of claim 1, wherein the authentication of the game data set as a whole in the first cycle of the parallel authentication includes comparing a computed message digest corresponding to the game data set.

5. The method of claim 1, wherein the authentication of the data files in the second cycle of the parallel authentication includes comparing computed message digests corresponding to the data files.

6. The method of claim 1, wherein the authentication of the data files in the second cycle of the parallel authentication includes a DSA verify operation.

7. The method of claim 1, further including, within the second cycle of the parallel authentication, authenticating the boot memory.

8. The method of claim 1, wherein the authentication of the game data set as a whole and each data file includes authenticating the data files in a order listed in the manifest file stored in the high capacity storage device.

9. A method of authenticating memory contents of a gaming machine, comprising:

storing, in at least one memory device, (i) a game data set including a plurality of data files and a file-level authentication code for each of the plurality of data files, and (ii) a game-data-set authentication code generated from the game data set as a whole, the plurality of data files including executable code files, sound files, and graphics files;

prior to operation of a wagering game at the gaming machine, authenticating the game data set as a whole using the game-data-set authentication code;

after authenticating the game data set as a whole, operating the wagering game at the gaming machine by using the executable code files, the sound files, and the graphics files from the plurality of data files; and during the operation of the wagering game at the gaming machine, conducting a continuous run-time authentication procedure having a first cycle and a second cycle, the first cycle including the repeated authentication of the game data set as a whole with the use of game-data-set authentication code, the second cycle including the repeated authentication of each of the plurality of data files with the use of the file-level authentication codes from the game data set that is subject to authentication in the first cycle.

10. The method of claim 9, further including, prior to operation of the wagering game at the gaming machine, authenticating a boot memory containing an authentication program to be used in the first cycle and the second cycle of the parallel authentication.

11. The method of claim 9, wherein the at least one memory device is a high-capacity storage device that is selected from the group consisting of a CD-ROM, a hard disk drive, and a flash storage device.

12. The method of claim 9, wherein the game-data-set authentication code is a message digest and the authentication of the game data set as a whole in the first cycle includes comparing a computed message digest corresponding to the game data set.

13. The method of claim 9, wherein the file-level authentication codes are message digests and the authentication of the data files in the second cycle of the parallel authentication includes comparing computed message digests corresponding to the data files.

14. The method of claim 9, wherein the file-level authentication codes are digital signatures and the authentication of the data files in the second cycle of the parallel authentication includes a DSA verify operation.

15. The method of claim 9, further including, within the second cycle of parallel authentication, authenticating a boot memory as a whole.

16. The method of claim 9, wherein the authentication of the data files includes authenticating the data files in an order listed in a manifest file stored in the at least one memory device, the manifest file being a file within the game data set and including the file-level authentication codes.

17. The method of claim 16, wherein the manifest file is authenticated in the first cycle of the parallel authentication as the game data set as a whole is authenticated.

18. The method of claim 16, wherein the another memory device is a serial memory containing jurisdictional-related information.

19. The method of claim 9, wherein the parallel authentication includes authenticating another memory device as a whole during the first cycle or second cycle.

* * * * *